United States Patent
Yajima

(10) Patent No.: US 9,285,049 B2
(45) Date of Patent: Mar. 15, 2016

(54) THERMOSTAT DEVICE
(75) Inventor: Noriyasu Yajima, Tokyo (JP)
(73) Assignee: Nippon Thermostat Co., Ltd. (JP)
( * ) Notice: Subject to any disclaimer, the term of this patent is extended or adjusted under 35 U.S.C. 154(b) by 573 days.
(21) Appl. No.: 13/520,556
(22) PCT Filed: Nov. 22, 2010
(86) PCT No.: PCT/JP2010/070820
   § 371 (c)(1),
   (2), (4) Date: Jul. 3, 2012
(87) PCT Pub. No.: WO2011/102036
   PCT Pub. Date: Aug. 25, 2011
(65) Prior Publication Data
   US 2012/0312884 A1    Dec. 13, 2012
(30) Foreign Application Priority Data
   Feb. 18, 2010   (JP) ................................. 2010-033041
(51) Int. Cl.
   *G05D 23/02*    (2006.01)
   *F16K 31/00*    (2006.01)
   *F16K 27/02*    (2006.01)
   *F01P 7/16*     (2006.01)
(52) U.S. Cl.
   CPC ................. *F16K 31/002* (2013.01); *F01P 7/16* (2013.01); *F16K 27/02* (2013.01); *G05D 23/022* (2013.01); *F01P 2025/32* (2013.01)
(58) Field of Classification Search
   CPC . G05D 23/022; G05D 23/1333; G05D 23/14; G05D 23/1373; G05D 23/1326; F01P 7/16
   USPC ..... 236/93 R, 93 A, 99 R, 34.5, 101 A, 99 C, 236/99 E
   See application file for complete search history.

(56) References Cited

U.S. PATENT DOCUMENTS

| | | | | |
|---|---|---|---|---|
| 4,890,790 A * | 1/1990 | Wagner | ........................ | 236/34.5 |
| 5,676,308 A * | 10/1997 | Saur | .............................. | 236/34.5 |
| 6,592,046 B2 * | 7/2003 | Suda | .............................. | 236/34.5 |
| 6,644,619 B2 * | 11/2003 | Friesenhahn et al. | ........... | 251/11 |
| 6,761,321 B2 * | 7/2004 | Takahashi | ................... | 236/34.5 |
| 6,915,958 B2 * | 7/2005 | Colas et al. | .................. | 236/34.5 |
| 7,730,855 B2 * | 6/2010 | Lemberger et al. | ........ | 123/41.08 |
| 2004/0238650 A1 * | 12/2004 | Luig et al. | .................. | 236/12.11 |
| 2005/0161519 A1 * | 7/2005 | Kalbacher et al. | ........... | 236/34.5 |
| 2006/0113399 A1 * | 6/2006 | Maraux et al. | .............. | 236/93 R |

FOREIGN PATENT DOCUMENTS

| | | | |
|---|---|---|---|
| CN | 100419319 C | 9/2008 | |
| EP | 1219879 A1 * | 7/2002 | ............. F16K 31/68 |
| EP | 1918545 A2 | 5/2008 | |
| EP | 1967714 A2 | 9/2008 | |
| JP | S60-125321 U | 8/1985 | |
| JP | 1986-194733 U | 12/1986 | |
| JP | S61-194733 U | 12/1986 | |
| JP | 1995-008527 U | 2/1995 | |
| JP | H07-8527 U | 2/1995 | |
| JP | 2003-222264 A | 8/2003 | |
| JP | 2006-274898 A | 10/2006 | |
| JP | 2006-274898 A1 | 10/2006 | |
| JP | 2006-342767 A | 12/2006 | |
| JP | 2008-223761 A | 9/2008 | |
| JP | 2008-223761 A | 9/2008 | |

* cited by examiner

*Primary Examiner* — Marc Norman
(74) *Attorney, Agent, or Firm* — Lerner, David, Littenberg, Krumholz & Mentlik, LLP

(57) ABSTRACT

A thermostat device having a first coolant flow path; a second coolant flow path; a casing including a thermostat container portion that communicates with the first and second coolant flow paths; a third coolant flow path that communicates with the thermostat container portion; a cap that covers the thermostat container portion; a thermostat including a thermoelement that advances and retreats in response to changes in temperature of a coolant that flows through the thermostat container portion; a temperature sensor disposed within the thermostat container portion and which detects the temperature of the coolant; a sensor mount in which the temperature sensor is embedded, integrated into an inside end of the cap; and a lead connector extending from the temperature sensor and integrated into an outside end of the cap.

4 Claims, 3 Drawing Sheets

THERMOSTAT DEVICE

CROSS-REFERENCE TO RELATED APPLICATION

This patent application is a national stage entry under 35 U.S.C. §371 of International Application No. PCT/JP2010/070820, filed on Nov. 22, 2010, which claims priority to Japanese Patent Application No. 2010-033041, filed on Feb. 18, 2010.

BACKGROUND OF THE INVENTION

1. Technical Field

The present invention relates to a cooling device for an internal combustion engine, a thermostat device, and more particularly, to a thermostat device that can be mounted as a single unit at a predetermined location near the engine, for example, without being imbedded in an engine constituent member such as the engine block, etc.

2. Description of the Background Art

Most cooling systems for vehicle internal combustion engines currently on the market cool the engine using a water-cooled system employing a coolant as the medium. In addition to 4-wheeled vehicles, this type of water-cooled cooling system is also widely employed in 2-wheeled vehicles as well.

The above-described water-cooled cooling system employed in internal combustion engines for vehicles has a radiator provided external to the engine. The radiator and the engine are connected by a rubber hose and the coolant is circulated between the radiator and the engine. The system is constructed of the radiator, which acts as a heat exchanger; a water pump, which forcibly pumps the coolant from the radiator to the engine; a thermostat that controls the flow of coolant based on the temperature of the coolant flowing from the radiator or flowing to the radiator to maintain the coolant at the proper temperature; and the rubber hose, which forms a circulation flow path for the coolant. The system prevents the engine from overheating while at the same time prevents the engine from overcooling during cold weather, and works always to maintain the engine at the proper temperature.

However, the applicant has already proposed a thermostat device for use in this type of water-cooled system in which the thermostat device is an externally mounted thermostat device that is mounted externally at a particular place such as the outside of the engine head (not shown), and moreover configured as a single unit housing the thermostat (i.e., a valve) (see, for example, JP-2006-342767-A).

In this conventional device, a thermo-element is inserted inside a casing and biased by a return spring, and in that state the casing is capped with a cap and the casing and the cap are then lasered or otherwise welded together.

In this type of thermostat device, a construction in which a temperature sensor that detects the temperature of the cooling water that flows through the interior of the device containing the thermostat has been proposed (see, for example, JP-2003-222264-A). In this conventional device, the temperature sensor is provided at a position where it does not project beyond a supporting step portion projecting from the inner wall of the casing so that the temperature sensor does not interfere with installation of a frame that seats the spring.

However, the thermostat device of JP-2006-342767-A experiences the following problem upon insertion of the temperature sensor described in JP-2003-222264-A.

That is, in this type of conventional device, the overall construction of the device becomes complicated, the number of constituent parts increases, and assembly becomes difficult. In particular, when it comes to installing the temperature sensor, where to insert the sensor becomes a problem, and what was once easy assembly becomes difficult and complicated.

Further, with this type of conventional device, it is desirable that the device have the least complicated structure possible and that it be capable of being made small and compact.

SUMMARY OF THE INVENTION

The present invention is conceived in light of the problems described above and has as its object to configure a thermostat device that can be mounted as a single unit on a vehicle (the engine, etc.) with a streamlined structure involving the minimum necessary number of parts, and moreover that can also provide improved ease of assembly.

To achieve the above-described object, the present invention provides a thermostat device comprising a first coolant flow path; a second coolant flow path; a casing including a thermostat container portion that communicates with the first and second coolant flow paths; a third coolant flow path that communicates with the thermostat container portion, a cap that covers the thermostat container portion; a thermostat including a thermo-element that advances and retreats in response to changes in temperature of a coolant that flows through the thermostat container portion, wherein, with the thermo-element closing the first coolant flow path, the third coolant flow path, the third coolant flow path side of the thermostat container portion, and the second coolant flow path are put into communication with each other, and with the thermo-element opening the first coolant flow path, the first coolant flow path side of the thermostat container portion and the second coolant flow path are put into communication with each other; a temperature sensor disposed facing into the thermostat container portion, that detects the temperature of the coolant; a sensor mount in which the temperature sensor is embedded integrated into an inside end of the cap; and a lead connector extending from the temperature sensor and integrated into an outside end of the cap.

The thermostat device further comprises a compression coil spring that biases the thermo-element disposed within the thermostat container portion, wherein the temperature sensor is disposed facing the inside of the compression coil spring.

In the above-described thermostat device, the sensor mount is made of a metal material, the cap is made of resin, and the sensor mount is integrated into the inside end of the resin cap with a tip of the sensor mount disposed facing the interior of the thermostat container portion, and further comprises an O-ring disposed so as to prevent coolant leakage from between the resin cap and a base of the sensor mount and a retainer ring that holds the O-ring in place.

In the above-described thermostat device, the sensor mount is made of a compound resin material, the cap is made of resin, and the sensor mount is integrated into the inside end of the resin cap with a tip of the sensor mount disposed facing the interior of the thermostat container portion, and further comprises a retainer ring provided around an outer peripheral portion of a base end of the sensor mount, with the retainer ring used as a bracket for the compression coil spring.

In the above-described thermostat device, the cap comprises a flange, an outer peripheral end of the flange engages an outer peripheral surface of an end of the casing and an inner peripheral surface of the end of the cap and an outer peripheral surface of the end of the casing are lasered-welded together, with a jig being contacted against the outside of the flange at a position corresponding to a position at which the compression coil spring contacts the inside of the flange when the inner peripheral surface of the end of the cap and the outer peripheral surface of the end of the casing are lasered-welded together.

In the above-described thermostat device, the first coolant flow path is a radiator-side coolant flow path, the second coolant flow path is an engine-side coolant flow path, and the third coolant flow path is a bypass-side coolant flow path.

With the thermostat device according to the present invention as described above, the thermostat is contained within the casing and the casing is capped with a cap to form a single unit. As a result, the thermostat device can be mounted in a vehicle (engine, etc.) as a single unit without being embedded in an engine constituent member such as the engine block, etc.

Further, with the present invention, by integrating the sensor mount that holds the temperature sensor that detects the temperature of the cooling water into the cap that encloses the thermo-element within the casing to form a single unit, the temperature sensor can be installed easily and without inviting an increase in the overall number of constituent parts. As a result, a small, compact thermostat device with a streamlined structure can be obtained, and moreover, the number of steps in the assembly of the thermostat device can be reduced, with the advantage that assembly is fast and easy.

In addition, with the present invention, the thermostat device has a structure in which the temperature sensor is disposed facing the inside of the compression coil spring that is the return spring that biases the thermo-element. As a result, by disposing the temperature sensor in the flow path of the cooling water that flows around the thermo-element and the thermo-element temperature sensitive portion, the water temperature around the thermo-element can be monitored to provide a diagnostic capability as to whether or not the thermostat is operating normally.

For example, in a case in which the main valve of the thermostat device gets stuck in the wide-open position and the temperature rises above the expected temperature, or the valve gets stuck in the closed position and the temperature falls below the expected temperature, it can be ascertained that the thermostat device is not operating normally as a result.

Moreover, with the present invention, an outer peripheral end of the flange of the cap engages an outer peripheral surface of the end of the casing, while simultaneously an inner peripheral surface of the end of the cap and the outer peripheral surface of the top end of the casing are lasered or otherwise welded and fixed together as a single unit. As a result, the casing and the cap can be easily made into a single unit.

Further, with the present invention, in order to improve temperature sensitivity an O-ring is provided so that cooling water does not get into a gap between the tip of the metal sensor and the flange of the resin cap, enabling the return spring and the retainer that holds that spring to hold down the O-ring properly and thus secure a reliable seal against entry by the cooling water.

In addition, with the present invention, in a case in which the sensor mount is made of resin and formed as a single unit with the cap, a retainer is provide on the base end of the sensor and is used as a bracket for the compression coil spring. As a result, the compression coil spring can be prevented from directly contacting the resin flange and thus damaging the flange.

Additionally, with the present invention, although the load of the return spring that biases the O-ring changes depending on how much the thermo-element moves, because at least a certain biasing force is constantly exerted on the retainer by the return spring, by optimizing the shape of the retainer 30 it functions as the O-ring groove that is used conventionally. As a result, even without providing an O-ring groove a certain tolerance can still be provided by the shape of the retainer. Further, since there is no need for an O-ring groove, there is also the advantage that the number of steps in the process of assembly can be reduced.

Moreover, with the structure of the present invention, when the cap into which the temperature sensor mount is integrated as a single unit encloses the thermo-element and the cap and case are lasered or otherwise welded together, the cap is chucked and pressed into place with a jig. In this case, stress is applied to a base R of the flange of the cap that can easily break or bend the flange. If the cap is lasered or otherwise welded in place in that state, a uniform welding surface cannot be obtained, with the risk that a strong seal and attachment cannot be obtained. However, with the present invention, the retainer biased by the return spring contacts the flange on a side opposite the side on which the jig and the flange contact each other and therefore can absorb the stress of the contact of the jig and the flange, thereby providing a structure that does not have the breakage or bending of the conventional arrangement.

Further, according to the present invention, the first coolant flow path is a radiator-side coolant flow path, the second coolant flow path is an engine-side coolant flow path, and the third coolant flow path is a bypass-side coolant flow path. With a configuration such as this, a thermostat device that can be installed in a vehicle (engine, etc.) as a single unit without being embedding in an engine constituent member such as the engine block, etc., can be easily and reliably obtained. Moreover, the number of parts is reduced to a minimum, assembly is easy, and costs can be reduced. Further, even with long-term use, in warm-weather driving the radiator-side flow path and the engine-side flow path can be completely shut off from each other.

DETAILED DESCRIPTION OF THE PREFERRED EMBODIMENTS

Figure 1:
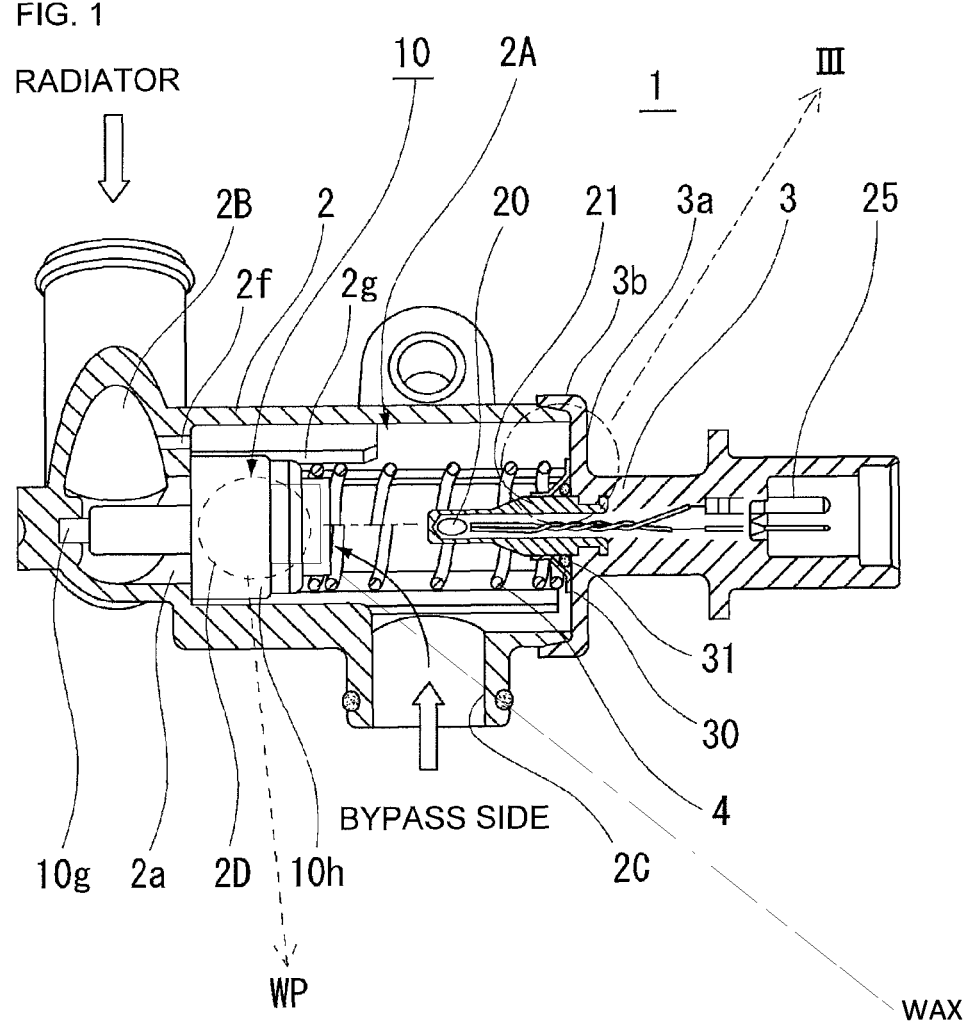
FIG. 1 is a schematic cross-sectional view of a thermostat device according to one embodiment of the present invention, in a low-temperature state.
Figure 2:
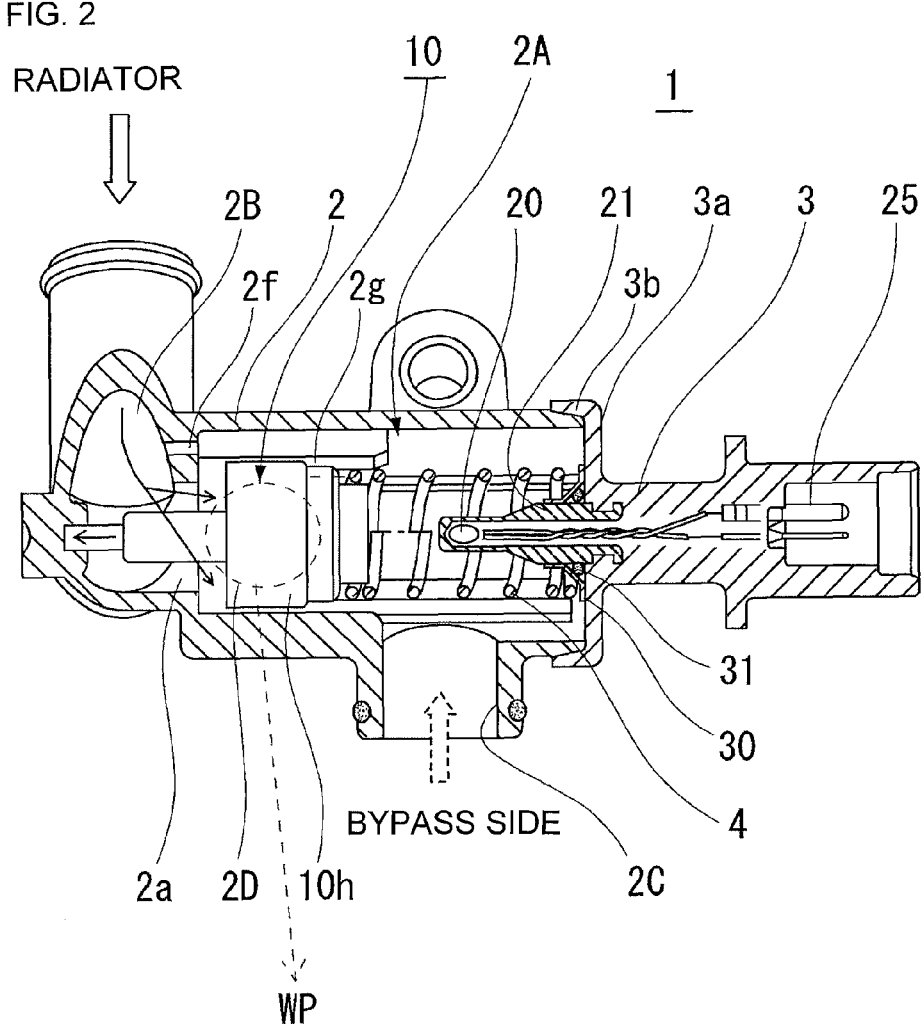
FIG. 2 is a schematic cross-sectional view of the thermostat device shown in FIG. 1, in a high-temperature state.

FIG. 1 and FIG. 2 show one embodiment of the thermostat device according to the present invention.

In these drawings, reference numeral 1 denotes a thermostat device. The thermostat device 1, as shown in the drawings, is an externally mounted thermostat device that is mounted externally at a particular place such as the outside of the engine head (not shown), and moreover is configured as a single unit housing a thermostat (i.e., valve) 10.

More specifically, the thermostat device 1 is constructed of the thermostat (valve) 10, a casing 2 that contains the thermostat (valve) 10, a cap 3 that caps a container portion 2A of the casing 2 that contains the thermostat (valve) 10, and a coil spring 4 that is inserted between the thermostat (valve) 10 and the cap 3 and which pushes a thermo-element 10h to the left in the drawings.

The casing 2, as described above, has the container portion 2A that contains the thermostat (valve) 10 formed in a middle part of the casing 2. The container portion 2A is open at a top end portion thereof.

A coolant flow path 2B through which coolant from a radiator flows is formed in a side of the casing 2. The radiator-side coolant flow path 2B is shown in the drawings as extending in a vertical direction, and communicates with the container portion 2A via an opening 2a.

Reference numeral 2f denotes an air escape aperture that allows air to escape from the device so that air does not accumulate inside the device. Reference numeral 2g denotes a rib that slidably supports the thermo-element 10h within the container portion 2A of the casing 2.

A bypass-side flow coolant flow path 2C bent substantially horizontally from approximately the vertical is formed as an opening toward the bottom in the drawings in an innermost portion of the radiator-side coolant flow path 2B, in the vicinity of the opening in the container portion 2A.

An engine-(water pump-) side coolant flow path 2D is formed in the casing 2 to the right of the radiator-side coolant flow path 2B, offset 90 degrees from the axis of the radiator-side coolant flow path 2B.

A vertical flange is formed in the casing 2, and a through-hole is formed in the flange. By passing a bolt, not shown, through the through-hole, the casing 2 is mounted on the engine head (not shown) or the like.

A description will now be given of the cap 3.

The cap has a rim 3b formed in an outer peripheral end of a flange 3a. The rim 3b fits over an end of the casing 2. The rim 3b fits over the outer periphery of the open end of the container portion 2A of the casing 2, and in that state these members are lasered or otherwise welded together to fix both members firmly together and in place.

Here, the thermostat (valve) 10, like the conventional thermostat (valve), is provided with an outwardly projecting piston 10g that advances and retreats with expansion and contraction of wax (not shown) held in a wax case and a diaphragm, not shown. The thermostat 10 operates by the piston 10g alternately advancing and retreating between the state shown in FIG. 1 and the state shown in FIG. 2 in response to temperature conditions of the ambient coolant, thereby opening and closing the first, second, and third coolant flow paths 2B, 2D, and 2C as appropriate.

More specifically, when the thermo-element (valve) 10h closes the opening 2a of the radiator-side coolant flow path 2B as shown in FIG. 1, coolant flowing in from the bypass-side flow coolant flow path 2C flows through the container portion 2A located at the bypass and into the engine-side (water pump-side) coolant flow path 2D. Since the radiator-side coolant flow path 2B is closed off, the radiator-side coolant flow path 2B and the engine-side (water pump-side) coolant flow path 2D do not communicate with each other.

By contrast, when the thermo-element (valve) 10h opens the opening 2a of the radiator-side coolant flow path 2B as shown in FIG. 2, coolant flowing in from the radiator-side coolant flow path 2B flows through the opening 2a and the container portion 2A and into the engine-side coolant flow path 2D. At this time, the outer peripheral surface of the thermo-element 10h blocks the bypass-side coolant flow path 3A from the engine-side (water pump-side) coolant flow path 2D.

Thus, as the thermo-element (valve) 10h alternately advances and retreats, it alternately opens and closes the radiator-side coolant flow path 2B and the engine-side (water pump-side) coolant flow path 2D The diameter of the thermo-element (valve) 10h is greater than the diameter of the opening 2a and substantially equal to the inner diameter of the rib 2g that slidably supports the thermo-element 10h.

It should be noted that, as shown in FIGS. 1 and 2, the engine-side (water pump-side) coolant flow path 2D is opened not entirely but only partially. Accordingly, it is necessary to take into account the coolant flow volume when determining the size (area) of the opened coolant flow path 2D.

According to the present invention, the thermostat device 1 having the configuration described above is provided with a temperature sensor 20 disposed facing the interior of the thermostat container portion 2A that detects the temperature of the coolant. The temperature sensor 20 is installed in a sensor mount 21, and the mount 21 is integrated into the cap 3 so as to project inwardly into the interior of the container portion 2A from an inside end of the cap 3. A lead connector 25 that extends from the temperature sensor 20 is integrated into an outside end of the cap 3.

With the configuration described above, the thermo-element 10h that becomes the thermostat 10 inside the casing 2 is contained within the casing 2, and at the same time the casing 2 is capped by the cap 3 to form a single unit. As a result, the thermostat device 1 can be mounted as a single unit in a vehicle (engine), for example, without being imbedded in an engine constituent member such as the engine block, etc.

Further, with the configuration described above, the sensor mount 21 that holds the temperature sensor 20 that detects the cooling water temperature is integrated into the cap 3 that seals the thermo-element 10h inside the casing 2. As a result, there is no overall increase in the number of constituent parts and the temperature sensor 20 can be installed simply and easily, thereby achieving a thermostat device that has a streamlined structure and is small and compact. Moreover, the number of steps in the process of assembling the thermostat device is reduced, with the advantage that assembly is quick and easy.

In particular, in the present embodiment, the temperature sensor 20 is disposed facing the inside of the compression coil spring 4 that is a return spring that biases the thereto-element 10h provided slidably within the thermostat container portion 2A.

Therefore, the temperature sensor 20 can be positioned in the flow path of the cooling water that flows around the temperature-sensitive part of the thermo-element 10h, thereby providing prompt and reliable monitoring of the water temperature in the vicinity of the thermo-element 10h and thus offering a diagnostic capability as to whether or not the thermostat 10 is operating normally.

For example, in a case in which the main valve of the thermostat device 1 gets stuck in the wide-open position and the temperature rises above the expected temperature, or the valve gets stuck in the closed position and the temperature falls below the expected temperature, it can be ascertained that the thermostat device 1 is not operating normally as a result.

Figure 3:
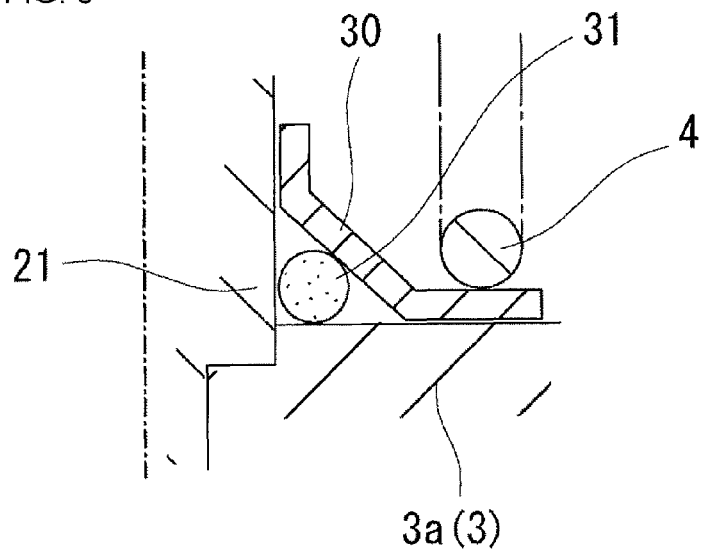
FIG. 3 is an enlarged cross-sectional view of a seal portion of the thermostat device shown in FIG. 1.

Moreover, according to the present invention, as is clear from FIG. 3, the sensor mount 21 is made of a metal material. The tip of the mount 21, in which is imbedded the temperature sensor 20, is disposed facing the interior of the thermostat container portion 2A, and in that state is integrated into the inside end of the resin cap 3.

Additionally, in this type of configuration, an O-ring 31 and a retainer ring 30 that holds the O-ring 31 in place is provided between the base end of the sensor mount 21 and the resin cap 3. The retainer ring 30 is also used as a spring bracket for the compression coil spring 4.

With this type of configuration, the O-ring 31 is provided so that cooling water does not get into a gap between the base end of the metal sensor mount 21 and the flange 3a of the resin cap 3, thereby enabling the return spring 4 and the retainer 30 that holds the spring 4 to hold down the O-ring 31 properly and thus securing a reliable seal against entry of the cooling water.

In addition, with this type of, configuration, as shown in FIG. 3, although the load of the return spring 4 that biases the O-ring 31 changes depending on how much the thermo-element 10h moves, because at least a certain biasing force is constantly exerted on the retainer 30 by the return spring 4, by optimizing the shape of the retainer 30 it functions as the O-ring groove that is used conventionally. As a result, even without providing an O-ring groove a certain tolerance can still be provided by the shape of the retainer. Further, since there is no need for an O-ring groove, there is also the advantage that the number of steps in the process of assembly can be reduced.

It should be noted that the sensor mount 21 need not be made of metal and instead may be made of resin. In the latter case, the resin sensor mount 21 is formed as a single unit with the cap 3, thus rendering the O-ring 31 unnecessary. In this case also, the retainer 30 is provided to the base end of the sensor mount 21, where the retainer 30 is used as a bracket for the compression coil spring. As a result, the compression coil spring 4 can be prevented from directly contacting the resin flange 3a and thus damaging the flange 3a.

Figure 4:
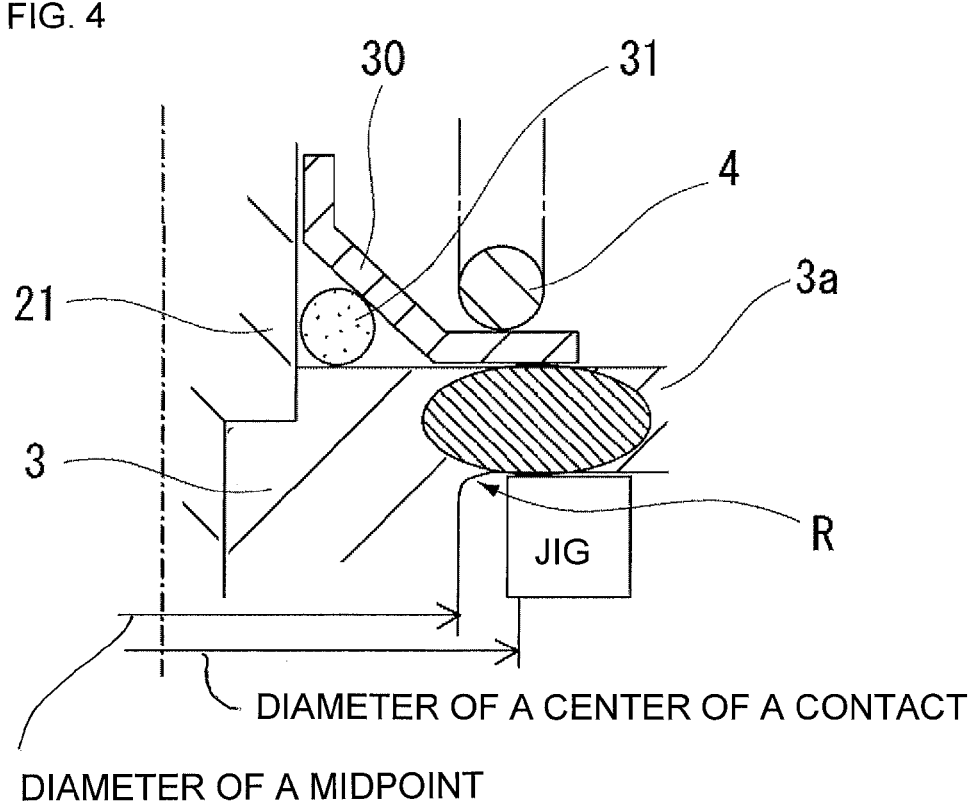
FIG. 4 is an enlarged cross-sectional view of a contact portion of the thermostat device shown in FIG. 1.

Moreover, according to the present invention, as shown in FIG. 4, an outer peripheral end of the flange 3a of the cap 3 engages an outer peripheral surface of the end of the casing 2, while simultaneously an inner peripheral surface of the end of the cap 3 and the outer peripheral surface of the top end of the casing 2 are lasered or otherwise welded and fixed together as a single unit, at which time the flange 3a of the cap 3 may be pressed from the outer side by a jig. It is desirable that a contact portion of the jig across which the jig contacts the flange 3a on the outside of the flange 3a have substantially the same diameter as a contact portion across which the compression coil spring 4 contacts the flange 3a on the inside of the flange 3a. This is, for example, dimensioned so as to be positioned on an outer periphery of % of a diameter dimension of the flange 3a (i.e., the flange midpoint) of the cap 3.

In such a configuration, since the outer peripheral end of the flange 3a of the cap 3 engages an outer peripheral surface of the end of the casing 2, while simultaneously an inner peripheral surface of the end of the cap 3 and the outer peripheral surface of the top end of the casing 2 are lasered or otherwise welded and fixed together as a single unit, the casing 2 and the cap 3 can be easily made into a single unit.

In addition, with the construction of the present invention, the mount 21 for the temperature sensor 20 is integrated into the cap 3 to enclose the thermo-element 10h, and, when lasered or otherwise welded together, the cap 3 is chucked and pressed into place with a jig. However, as shown in FIG. 4, in that case stress is applied to a base R of the flange 3a of the cap 3 that can easily break or bend the flange 3a. If the cap 3 is lasered or otherwise welded in place in that state, a uniform welding surface cannot be obtained, with the risk that a strong seal and attachment cannot be obtained. However, with the present invention, the retainer 30 biased by the return spring 4 contacts the flange 3a on a side opposite the side on which the jig and the flange 3a contact each other and therefore can absorb the stress of the contact of the jig and the flange 3a, thereby providing a structure that does not have the breakage or bending of the conventional arrangement.

Further, according to the present invention, the first coolant flow path 2B is a radiator-side coolant flow path, the second coolant flow path 2D is an engine-side coolant flow path connected to the WP (water pump), and the third coolant flow path 2C is a bypass-side coolant flow path.

With a configuration such as this, the thermostat device 1 that can be installed in a vehicle (engine, etc.) as a single unit without being embedding in an engine constituent member such as the engine block, etc. (not shown) can be easily and reliably obtained. Moreover, the number of parts is reduced to a minimum, assembly is easy, and costs can be reduced. Further, even with long-term use, in warm-weather driving the radiator-side flow path and the engine-side flow path can be completely shut off from each other.

A description is now given of assembly of the thermostat device 1 described above.

That is, the thermo-element 10h and the return spring 4 are inserted into the casing 2, the cap 3 with the O-ring 31 and the retainer ring 30 integrated into the inside end side thereof is fitted onto the open end of the container portion 2A of the casing 2, and the joint between the container 2 and the cap 3 is lasered or otherwise welded in place, thereby integrating these elements to prepare a single unit capable of opening and closing the necessary flow paths, as can be easily understood.

Embodiments of the present invention are not limited to the structures described above, and the shape and construction of the parts that compose the thermostat device 1 may be modified and varied as needed.

In addition to 4-wheeled vehicles, the thermostat device 1 according to the present invention can also be used in cooling systems widely employed in 2-wheeled vehicles as well.

What is claimed is:

1. A thermostat device comprising:
   a first coolant flow path;
   a second coolant flow path;
   a casing including a thermostat container portion that communicates with the first and second coolant flow paths;
   a third coolant flow path that communicates with the thermostat container portion;
   a cap that covers the thermostat container portion;
   a thermostat including a thermo-element that advances and retreats in response to changes in temperature of a coolant that flows through the thermostat container portion,
   wherein, with the thermo-element closing the first coolant flow path, the third coolant flow path, a third coolant flow path side of the thermostat container portion, and the second coolant flow path are put into communication with each other, and with the thermo-element opening the first coolant flow path, the first coolant flow path side of the thermostat container portion and the second coolant flow path are put into communication with each other;
   a temperature sensor disposed within the thermostat container portion and which detects the temperature of the coolant;
   a sensor mount in which the temperature sensor is embedded, integrated into an inside end of the cap;
   a lead connector extending from the temperature sensor and integrated into an outside end of the cap; and
   a single compression coil spring that biases the thermo-element, the thermo-element being disposed within the thermostat container portion,
   wherein the temperature sensor is disposed inside the compression coil spring; and
   wherein the compression coil spring that biases the thermo-element disposed within the thermostat container portion also biases a retainer ring for an O-ring that holds the O-ring in place,
   wherein the thermostat device lacks a groove for the O-ring.

2. The thermostat device according to claim 1, wherein the sensor mount is made of a metal material, the cap is made of resin, and the sensor mount is integrated into the inside end of the resin cap with a tip of the sensor mount disposed projecting into the interior of the thermostat container portion,
   wherein the O-ring is so disposed as to prevent coolant leakage from between the resin cap and a base of the sensor mount.

3. The thermostat device according to claim 1, wherein the sensor mount is made of a compound resin material, the cap is made of resin, and the sensor mount is integrated into the inside end of the resin cap with a tip of the sensor mount disposed projecting into the interior of the thermostat container portion,
   wherein the retainer ring is provided around an outer peripheral portion of a base end of the sensor mount, and the retainer ring is used as a bracket for the compression coil spring.

4. The thermostat device according to claim 1, wherein:
the first coolant flow path is a radiator-side coolant flow path;
the second coolant flow path is an engine-side coolant flow path; and
the third coolant flow path is a bypass-side coolant flow path.

\* \* \* \* \*